(12) United States Patent
Deka et al.

(10) Patent No.: US 12,398,061 B2
(45) Date of Patent: Aug. 26, 2025

(54) MICROSPHERE-BASED INSULATING MATERIALS FOR USE IN VACUUM INSULATED STRUCTURES

(71) Applicant: WHIRLPOOL CORPORATION, Benton Harbor, MI (US)

(72) Inventors: Lakshya J. Deka, Mishawaka, IN (US); Nicole M. Ernat, Stevensville, MI (US); Ashish Nigam, St. Joseph, MI (US); Shayta Roy, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1251 days.

(21) Appl. No.: 17/040,725

(22) PCT Filed: Apr. 9, 2018

(86) PCT No.: PCT/US2018/026712
§ 371 (c)(1),
(2) Date: Sep. 23, 2020

(87) PCT Pub. No.: WO2019/199266
PCT Pub. Date: Oct. 17, 2019

(65) Prior Publication Data
US 2021/0002162 A1 Jan. 7, 2021

(51) Int. Cl.
*C03B 19/10* (2006.01)
*B01J 13/04* (2006.01)
(Continued)

(52) U.S. Cl.
CPC ........... *C03B 19/1095* (2013.01); *B01J 13/04* (2013.01); *B01J 13/22* (2013.01); *C08J 9/0066* (2013.01); *C08J 9/32* (2013.01); *Y10T 428/231* (2015.01)

(58) Field of Classification Search
CPC ....... C03B 19/1095; B01J 13/04; B01J 13/22; C08J 9/0066; C08J 9/32; Y10T 428/231;
(Continued)

(56) References Cited

U.S. PATENT DOCUMENTS

| 3,607,169 A | 9/1971 | Coxe |
| 3,769,770 A | 11/1973 | Deschamps et al. |

(Continued)

FOREIGN PATENT DOCUMENTS

| RU | 2233808 | 8/2004 |
| SU | 1281551 | 1/1987 |
| WO | 20112020802 | 2/2011 |

OTHER PUBLICATIONS

Machine Translation of WO 2011/020802 A2. (Year: 2011).*

*Primary Examiner* — Brian Handville
(74) *Attorney, Agent, or Firm* — Price Heneveld LLP

(57) ABSTRACT

A low-density insulating material for use in a vacuum insulated structure for an appliance includes a plurality of microspheres that includes a plurality of leached microspheres. Each leached microsphere has an outer wall and an interior volume. The outer wall has a hole that extends through the outer wall and to the interior volume. A binder engages outer surfaces of the plurality of leached microspheres, wherein the binder cooperates with the plurality of leached microspheres to form at least one microsphere aggregate. The interior volume of each leached microsphere defines an insulating space that includes an insulating gas. The insulating space of each leached microsphere is at least partially defined by the binder.

20 Claims, 12 Drawing Sheets

(51) Int. Cl.
*B01J 13/22* (2006.01)
*C08J 9/00* (2006.01)
*C08J 9/32* (2006.01)

(58) Field of Classification Search
CPC ............. F25D 2201/122; F25D 23/062; F25D 2201/14; C08L 91/06
See application file for complete search history.

(56) References Cited

U.S. PATENT DOCUMENTS

| | | | |
|---|---|---|---|
| 4,303,732 | A | 12/1981 | Torobin |
| 4,529,638 | A * | 7/1985 | Yamamoto ............. B32B 27/14 220/592.2 |
| 5,500,287 | A | 3/1996 | Henderson |
| 6,858,280 | B2 | 2/2005 | Allen et al. |
| 7,794,805 | B2 | 9/2010 | Aumaugher et al. |
| 2004/0018336 | A1 * | 1/2004 | Farnworth ............... A43B 7/34 428/312.8 |
| 2005/0175809 | A1 * | 8/2005 | Hirai .................... F25D 23/065 428/69 |
| 2010/0139320 | A1 | 6/2010 | Schumacher et al. |
| 2015/0140258 | A1 * | 5/2015 | Bouesnard .......... E06B 3/66371 428/69 |
| 2016/0207817 | A1 * | 7/2016 | Hojaji ..................... C08K 7/28 |

* cited by examiner

MICROSPHERE-BASED INSULATING MATERIALS FOR USE IN VACUUM INSULATED STRUCTURES

FIELD OF THE DEVICE

The device is in the field of insulating materials for use in insulating structures, and more specifically, a microsphere-based insulating system that can be disposed within an insulating structure for an appliance and other vacuum-insulated structures.

SUMMARY

In at least one aspect, a low-density insulating material for use in a vacuum insulated structure for an appliance includes a plurality of microspheres having a plurality of leached microspheres. Each leached microsphere has an outer wall and an interior volume. The outer wall has at least one hole that extends through the outer wall and to the interior volume. A binder engages outer surfaces of the plurality of leached microspheres, wherein the binder cooperates with the plurality of leached microspheres to form at least one microsphere aggregate. The interior volume of each leached microsphere defines an insulating space that includes an insulating gas. The insulating space of each leached microsphere is at least partially defined by the binder.

In at least another aspect, a refrigerating appliance includes an inner liner and an outer wrapper that define an insulating cavity therebetween. An at least partial vacuum is defined within the insulating cavity. A plurality of microsphere aggregates are disposed within the insulating cavity. Interstitial spaces are defined between the microsphere aggregates. Each microsphere aggregate includes at least one leached microsphere having a leached opening that extends through an outer wall and to an interior volume of each leached microsphere. A binder engages an outer surface of the outer wall, wherein the binder is disposed within a portion of the leached opening and at least partially defines the interior volume. The interior volume of each leached microsphere defines an insulating space that is at least partially defined by the binder. The binder and the outer wall define a substantially air-tight seal around the insulating space.

In at least another aspect, a method for forming an insulating microsphere for use in an appliance cabinet includes heating glass particles to a predetermined temperature to define molten glass particles, wherein the molten glass particles form a microsphere having an outer wall and an interior volume that defines a hollow microsphere. The molten glass particles are cooled to an intermediate temperature, to define solid microspheres, wherein the intermediate temperature is less than approximately 400 degrees Celsius. The solid microspheres are coated with an opacifier, wherein the heating, cooling and coating steps occur within a single assembly.

In at least another aspect, a method for forming low-density microsphere aggregates includes leaching a plurality of microspheres to define leached microspheres, wherein each leached microsphere includes an outer wall and an interior volume. Each leached microsphere includes at least one of a cavity and a hole within the outer wall of the leached microsphere. The method also includes evacuating air from within the interior volume of each leached microsphere having a hole to define an insulating space within each leached microsphere having a hole. The method also includes coating the leached microspheres with a binder, wherein the binder engages the leached microspheres and at least partially occupies at least a portion of the holes of the leached microspheres, and the binder at least partially defines the insulating space of the leached microsphere having a hole. The method also includes mixing the leached microspheres and the binder within a mixer. Mixing of the leached microspheres and the binder results in a plurality of microsphere aggregates, and at least a portion of the leached microspheres within the microsphere aggregates includes the insulating space.

These and other features, advantages, and objects of the present device will be further understood and appreciated by those skilled in the art upon studying the following specification, claims, and appended drawings.

DETAILED DESCRIPTION OF EMBODIMENTS

Figure 1:
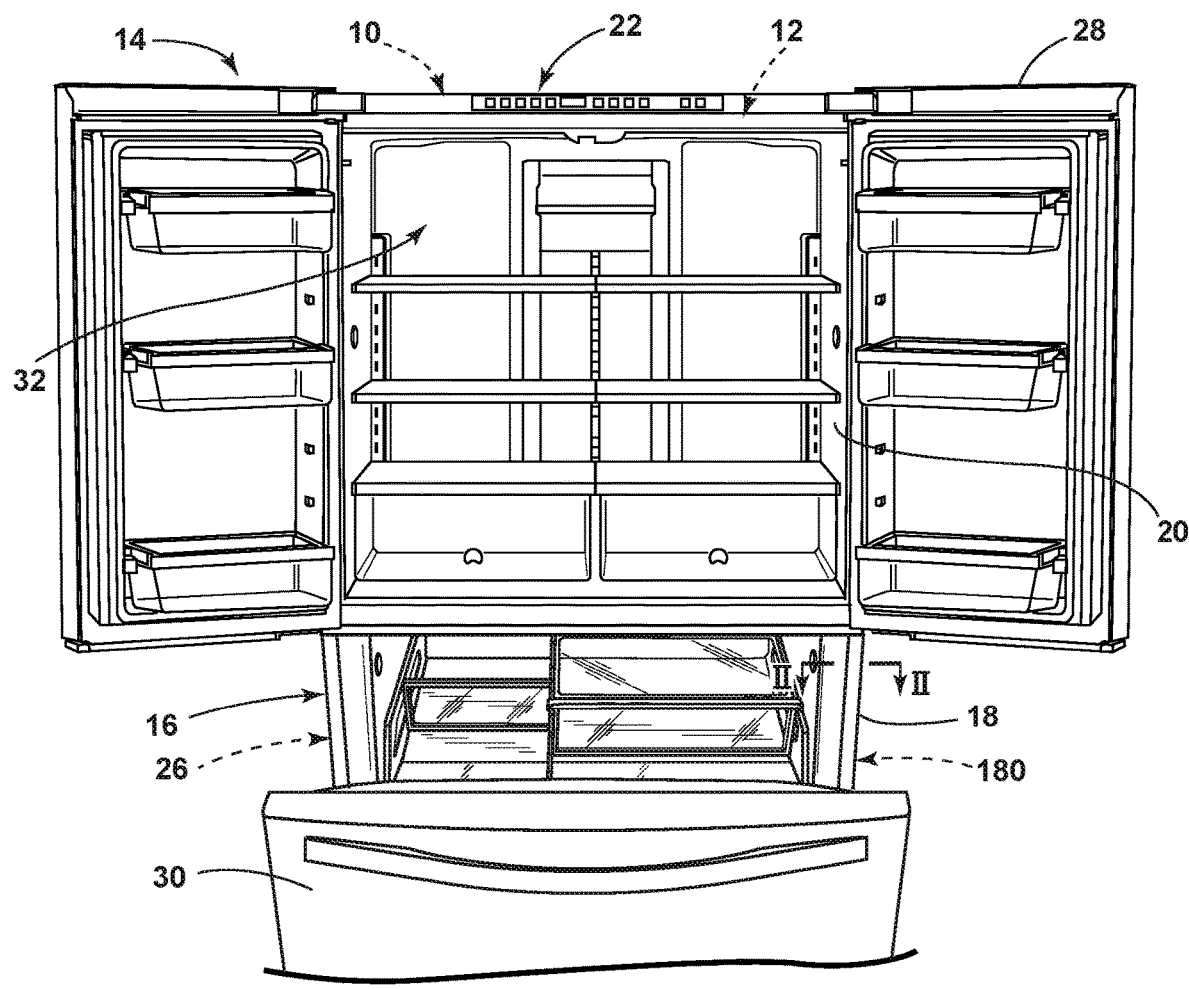
FIG. 1 is a front perspective view of a refrigerating appliance that incorporates an aspect of the microsphere insulating material.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1, 2, 9 and 15, reference numeral 10 generally refers to a low-density insulating material that can be disposed within an insulating cavity 12 of an appliance 14. The refrigerating appliance 14 includes a cabinet 16 that forms the structure for the appliance 14. The cabinet 16 can include an outer wrapper 18 and an inner liner 20 that cooperate to form the insulating cavity 12 therebetween. The cabinet 16 of the appliance 14 can define a vacuum insulated structure 22 where air is expressed, expelled, or otherwise removed from the insulating cavity 12 of the cabinet 16 to form an at least partial vacuum 26 within the vacuum insulated structure 22. In various aspects of the device, the vacuum insulated structures 22 can be pre-formed and then placed within the insulating cavity 12 to increase the thermal insulating properties of the appliance 14. The appliance 14 can include various doors 28 and drawers 30 that can be used to provide access to various interior compartments 32 of the appliance 14.

As exemplified in FIGS. 1, 2, 9 and 15, the refrigerating appliance 14 can include the inner liner 20 and outer wrapper 18 that define the insulating cavity 12 therebetween, and wherein an at least partial vacuum 26 is defined within the insulating cavity 12. A plurality of microsphere aggregates 34 are disposed within the insulating cavity 12 and various interstitial spaces 36 are formed between the microsphere aggregates 34. In various aspects of the device, a secondary insulating material 38, in the form of an insulating powder, insulating microspheres 52, silica-based insulating materials, combinations thereof and other similar insulating components can be disposed within these interstitial spaces 36 between the microsphere aggregates 34.

Referring again to FIGS. 1, 2, 9 and 15, these microsphere aggregates 34 can include one or more leached microspheres 40 having a leached opening 42 that extends through an outer wall 44 of the leached microsphere 40 and into the interior volume 46 of the leached microsphere 40. These leached microspheres 40 can be made to include at least one cavity 48 and through holes 50 that are formed through a process of leaching by heating glass microspheres 52 to a particular temperature and then placing the heated microspheres 54 (shown in FIG. 10) into an acid bath 56. In the acid bath 56, various components of the microspheres 52 can be removed from the outer wall 44 of the microsphere 52 and leaving the various cavities 48 and through holes 50. The process of leaching will be described more fully below.

Referring again to FIGS. 1, 2, 9 and 15, the microsphere aggregates 34 can also include a binder 70 that engages an outer surface 72 of the outer wall 44 of the plurality of leached microspheres 40. The binder 70 cooperates with the plurality of leached microspheres 40 to form at least one microsphere aggregate 34. The binder 70 can be disposed within a portion of the various leached openings 42 in the form of the cavities 48 and through holes 50 defined within the outer wall 44 of the various leached microspheres 40. In this manner, the binder 70 that is disposed within these leached openings 42, and particularly within the through holes 50, can at least partially define the interior volume 46 of the various leached microspheres 40. In various aspects of the device, the interior volume 46 of each leached microsphere 40 of the microsphere aggregates 34 defines an insulating space 74. This insulating space 74 can be at least partially defined by the binder 70 that occupies the various leached openings 42 of the leached microspheres 40 of the microsphere aggregates 34. With the binder 70 surrounding the outer wall 44 and the various leached openings 42 of the leached microspheres 40, the binder 70 and the outer wall 44 cooperate to define a substantially air-tight seal around the insulating space 74 of the leached microsphere 40. This insulating space 74 can be defined by an at least partial vacuum 26 where air 24 is evacuated from the interior space 262 of the microsphere 52 and a low pressure area is defined within this insulating space 74. Various insulating gases 76 can also be disposed within the insulating space 74. These insulating gases 76 can be maintained at atmosphere or could be maintained at a lower pressure. Accordingly, a partial vacuum 26, in combination with the insulating gas 76, can define the insulating space 74 of the various leached microspheres 40 within the microsphere aggregates 34.

Referring again to FIG. 2, within the cabinet 16 for the appliance 14, the insulating cavity 12 defined between the inner liner 20 and outer wrapper 18 can hold the microsphere aggregates 34 as part of the low-density insulating material 10. Along with the microsphere aggregates 34, the insulating cavity 12 of the cabinet 16 can include an insulating gas 76 that is disposed within the insulating cavity 12 to substantially occupy the interstitial spaces 36 and/or various secondary interstitial spaces 78. These secondary interstitial spaces 78 are defined between the plurality of microsphere aggregates 34 and also between various particles of insulating powder and other components of a secondary insulating material 38 that are disposed within the insulating cavity 12 having the microsphere aggregates 34. By using the microsphere aggregates 34, the secondary insulating material 38 and the insulating gas 76, the entire insulating cavity 12, or substantially all of the insulating cavity 12, can be filled with various insulating components that improve the thermal insulating properties of the cabinet 16 and other panel components for the appliance 14.

Figure 2:
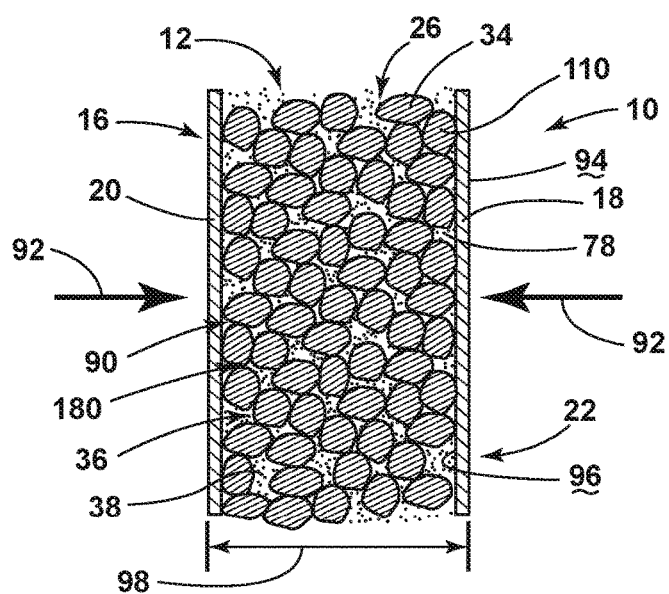
FIG. 2 is a cross-sectional view of a wall for a cabinet of the appliance of FIG. 1, taken along line II-II.
Figure 3:
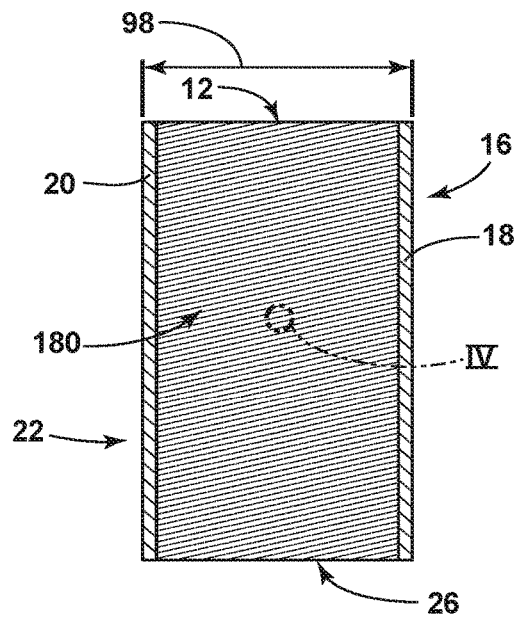
FIG. 3 is a cross-sectional view of the appliance of FIG. 1 showing an aspect of the microsphere insulating material.

According to various aspects of the device, as exemplified in FIG. 2, the microsphere aggregates 34 can substantially fill the insulating cavity 12 defined within the cabinet 16 for the appliance 14. The microsphere aggregates 34 provide an interior structure 90 within the insulating cavity 12 that supports the positioning of the inner liner 20 and the outer wrapper 18 with respect to one another. In various aspects of the appliance 14, air is drawn from the insulating cavity 12 to define an at least partial vacuum 26 within the insulating cavity 12. During this process of expressing, expelling, or otherwise removing air 24 from the insulating cavity 12, the resulting partial vacuum 26 within the insulating cavity 12 results in inward compressive forces 92 being exerted against an exterior surface 94 of the cabinet 16 along the outer wrapper 18 and the inner liner 20. The plurality of microsphere aggregates 34 disposed within the insulating cavity 12 engage the inner surface 96 of the cabinet 16 that defines the insulating cavity 12. This positioning of the plurality of microsphere aggregates 34 serves to define the interior structure 90 that substantially opposes the inward compressive force 92 exerted upon the exterior surface 94 of the cabinet 16 for the appliance 14. Through the use of the interior structure 90 made up of the microsphere aggregates 34, when the vacuum is defined within the insulating cavity 12, the microsphere aggregates 34 serve to resist inward deflection of the inner liner 20 and outer wrapper 18 that may otherwise result from the inward compressive force 92. Accordingly, various deformation and other types of aesthetic demarcation within the exterior surface 94 of the inner liner 20 and the outer wrapper 18 can be substantially prevented. This deflection caused by the inward compressive force 92 of the partial vacuum 26 can also lead to thinning of various portions of the cabinet 16 and diminished thermal performance within these areas. The use of the microsphere aggregates 34 serves to oppose this deformation such that the cabinet 16 defines a substantially consistent width 98 throughout the various walls of the structural cabinet 16 for the appliance 14.

To provide the interior structure 90 defined by the microsphere aggregates 34, it is typical that each microsphere aggregate 34 of the plurality of microsphere aggregates 34 is in direct engagement with at least one adjacent microsphere aggregate 110 of the plurality of microsphere aggregates 34. In this manner, the various microsphere aggregates 34 support one another within the insulating cavity 12 to prevent the deformation or aesthetic demarcation within the structural cabinet 16. As discussed previously, the microsphere aggregates 34, when disposed and packed within the insulating cavity 12, define various interstitial spaces 36 therebetween. These interstitial spaces 36 can be occupied by secondary insulating materials 38 that define secondary interstitial spaces 78. An insulating gas 76 can be used to substantially occupy the interstitial spaces 36 and the secondary interstitial spaces 78. In various aspects of the device, the interstitial and secondary interstitial spaces 36, 78 can be maintained at an at least partial vacuum 26.

Referring again to FIGS. 2, 9 and 15, the various microsphere aggregates 34 can be surrounded by an opacifier 120 that substantially coats each microsphere aggregate 34. According to various aspects of the device, the opacifier 120 can be disposed within the binder 70. The opacifier 120 can also be delivered by the binder 70 during formation of the microsphere aggregates 34.

According to various aspects of the device, the opacifier 120 that is disposed within or around the microsphere aggregate 34 can be disposed proximate or around an outside surface 290 or at least a portion of the outside surface 290 of each microsphere aggregate 34. In such an embodiment, it is typical that the microsphere aggregates 34 are formed and an opacifier 120 is placed around the microsphere aggregates 34. As discussed previously, the binder 70 can contain or at least partially deliver portions of the opacifier 120 that make up the components of the microsphere aggregate 34.

According to various aspects of the device, the binder 70 used to form the microsphere aggregates 34 can be in the form of polyethylene glycol (PEG), resin, one or more natural waxes, one or more synthetic waxes, combinations thereof, and other similar materials that can be used to solidify and bind together various microspheres 52 to form the microsphere aggregates 34.

According to various aspects of the device, the opacifier 120 that is used to coat or at least partially coat the various microsphere aggregates 34 can be in the form of carbon black, silicon carbide, zinc oxide, titanium oxide, rice husk ash, other plant material having a high silica content, combinations thereof, and other similar materials having a high resistance to radiative thermal conductivity.

Additionally, the various insulating gases 76 used within the formation of the microspheres 52 and in the formation of the structural cabinet 16 can include, but are not limited to, carbon dioxide, argon, xenon, krypton, neon, combinations thereof, and other similar thermally insulating gases 76.

The secondary insulating material 38 that can be disposed within the interstitial spaces 36 defined between the microsphere aggregates 34 can include, but is not limited to, various opacifiers 120, silica-based materials, insulating powders, microspheres 52, hollow microspheres, glass fiber, insulating gas 76, combinations thereof, and other similar insulating materials.

Referring now to FIGS. 9-11 and 15, the leached microspheres 40 have various portions of the outer wall 44 of the microspheres 52 removed therefrom. The removal of this material is typically a result of the leaching process 130. In the leaching process 130, the microspheres 52 are heated to a phase separating temperature 132 within a range of from approximately 400 degrees Celsius to approximately 900 degrees Celsius. In this heating process 190, which can last from approximately one half hour to approximately two hours, the microspheres 52 experience a phase separation where certain materials within the microspheres 52 migrate to an outer periphery 134 of the microsphere 52. Typically, the leached microspheres 40 and the partially leached microspheres 150 are derived from boron-based glass. The boron-based glass can include, but is not limited to, borosilicate glass, aluminosilicate glass, boroaluminosilicate glass and other similar glass-type materials. During the leaching process 130, the boron 136 within the borosilicate glass migrates to the outer periphery 134 of the microsphere 52. After the heating process 190 is complete, the phase separated microspheres 138 are placed within an acid bath 56 and moved within the acid bath 56. Typically, hydrochloric acid is used as the acid, however, other acids can be used for interacting with the migrated boron 136. Because the boron 136 has migrated to the outer periphery 134 of the microsphere 52, the acid interacts with the boron 136 and leaches and/or etches the boron 136 away from the outer wall 44 of the microsphere 52. The remaining material, typically a silica-based material, defines an outer wall 44 that includes the cavities 48 and through holes 50 where the boron 136 has been removed. The acid does not typically interact with the silica-based material.

Additionally, in the heating process 190, the temperature experienced by the heated and phase-separated microspheres 54, 52 causes the boron 136 to migrate to the outer periphery 134 of the microsphere 52. The remaining components of the microsphere 52 remains substantially intact. As will be described more fully below, the leached microspheres 40 can be used to remove air 24 from, or to inject gas into, the insulating space 74 defined within the interior volume 46 of the leached microspheres 40.

By using leached microspheres 40 that have boron 136 removed, the microsphere aggregates 34, having the leached microspheres 40, are much lighter and less dense than aggregates that include intact microspheres 52. Accordingly, the use of the microsphere aggregates 34 can be used to form a low-density insulating material 10. Because the overall weight of each microsphere aggregate 34 is less, the overall weight of the low-density insulating material 10 is also less, and, in turn, the overall weight of the appliance 14 is also decreased through the use of the low-density insulating material 10.

Through the leaching process 130, it should be understood that certain microspheres 52 may not be fully leached such that some amount of boron 136 may remain within various leached microspheres 40. Additionally, some of the leached microspheres 40 may also be free of through holes 50. These partially-leached microspheres 150 (shown in FIG. 14) may contain cavities 48 (shown in FIG. 15) within the outer wall 44 that do not extend entirely through the outer wall 44 of the microsphere 52. In these partially-leached microspheres 150, the interior volume 46 of the microsphere 52 will typically contain gas in the form of air 24. In various aspects of the device, the interior volume 46 of the partially-leached microsphere 150 may also include an insulating gas 76 in the form of carbon dioxide or other byproduct generated during the formation of the microsphere 52. This process will be described more fully below.

In various aspects of the device, individual microspheres 52 can also be used within the insulating cavity 12 in the form of the secondary insulating material 38. These individual microspheres 52 can also be manufactured within a single assembly so that various sequential steps can be performed in preparing a microsphere-based insulating material 180 for use in an insulating cavity 12 of an appliance 14.

As exemplified in FIGS. 3-8 and 16, microspheres 52 can be formed and coated with an opacifier 120 within a single assembly. Through this assembly, the various microspheres 52 can be formed from glass particles 160 or glass frit and, during a cooling phase 162 of the glass microspheres 52, can be coated with an opacifier 120. As discussed above, the opacifier 120 used typically reduces the radiative component of thermal conductivity of the article that it surrounds, in this case, the microspheres 52. As exemplified in FIG. 16, a method 400 is disclosed for forming an insulated microsphere 52 in the form of an opacifier-coated microsphere 164 for use in an appliance cabinet 16. This method 400 can include step 402 of heating glass particles 160 to a predetermined temperature 166 to define molten glass particles 168. Typically, the glass particles 168 are pre-sized glass particles 168 that are designed to result in a microsphere 52 having a correspondence size. To form the glass microspheres 52, the glass particles 160 are heated to the predetermined temperature 166 of from approximately 900 degrees Celsius to approximately 1100 degrees Celsius. This predetermined temperature 166 creates molten glass particles 168 that generate a gas within the interior of the molten glass particles 168. As this gas is generated, the molten glass particle 168 takes the form of a generally spherical shape having an outer wall 44 with an interior volume 46 defined therein. This generally spherical shape having the interior volume 46 is generally described as a hollow microsphere 52. The molten glass particles 168 are then cooled during a cooling phase 162 to an intermediate temperature 170 where the various components of the molten glass particles 168 can solidify into heated microspheres 54 (step 404). The temperature that the components of the molten glass particles 168 solidify can be approximately 400° C. Once this intermediate temperature 170 is reached, the heated solid microspheres 172 can typically be coated with an opacifier 120 (step 406). The components used for the opacifier 120 can be those discussed previously. The opacifier 120 can be adhered to the heated solid microspheres 172 through static adhesion. A binder or other adhering material can also be used to adhere the opacifier 120 to the heated solid microspheres 172.

Referring again to FIGS. 3-8 and 16, the time period used to create the opacifier-coated microspheres 164 can be relatively short. Formation of the molten glass particles 168 may take only a fraction of a second. Because the molten glass particles 168 are so small, the cooling phase 162 of the molten glass particles 168 can be relatively quick and in the order of minutes. During this cooling phase 162, the various heated solid microspheres 172 can be placed within a drum and agitated within the drum where an opacifier 120 is also disposed therein. While being mixed within the drum, and opacifier 120 and the heated solid microspheres 172 can combine to form the opacifier-coated microspheres 164. The microspheres 52 can be cooled using air, a heat exchanger, fluids, or other similar cooling process and/or medium. These opacifier-coated microspheres 164 can be formed during the cooling phase 162 of the various microspheres 52. Accordingly, the overall time to create the opacifier-coated microspheres 164 can be less than ten minutes. Once the opacifier-coated microspheres 164 are generated, these opacifier-coated microspheres 164 can be moved through an assembly line for packaging, delivery, or installation within an insulating structure. By combining the processes of forming the microspheres 52 and coating the microspheres 52 into a single assembly, various steps in the process of forming an opacifier-coated microsphere 164 can be minimized and additional transportation steps can be made substantially unnecessary. This can save great expense and limit the use of resources during formation of the opacifier-coated microspheres 164.

Figure 4:
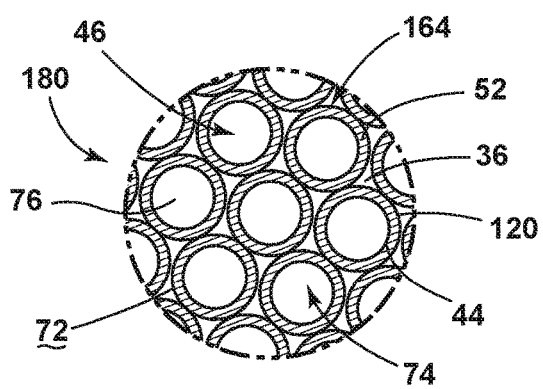
FIG. 4 is an enlarged view of the microsphere insulating material of FIG. 3 taken at area IV and showing packed microspheres.
Figure 5:
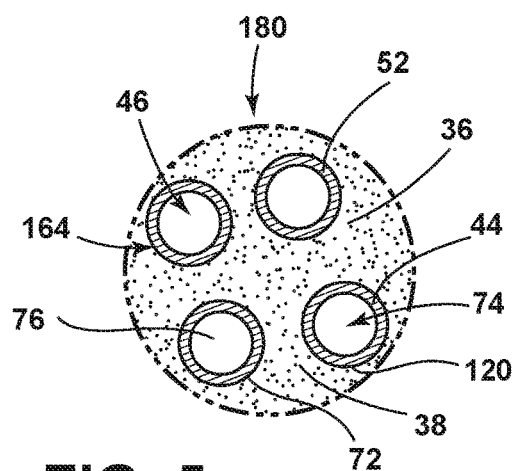
FIG. 5 is an enlarged view of an aspect of the insulating material of FIG. 3 showing a combination of microspheres and additional particulate material disposed within an insulating cavity of the appliance.
Figure 6:
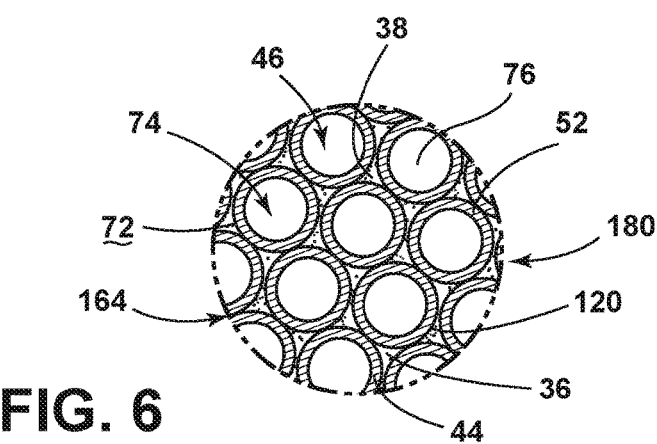
FIG. 6 is an enlarged view of an aspect of the insulating material of FIG. 3 and showing microspheres and insulating particulate material combined together within the insulating cavity.

Referring now to FIGS. 3-6, the opacifier-coated microspheres 164 can be used within a microsphere-based insulating material 180 in various applications. The opacifier-coated microspheres 164 can be packed within an insulating cavity 12 (FIG. 4). The interstitial spaces 36 or secondary interstitial spaces 78 between the opacifier-coated microspheres 164 can be depressurized to form an at least partial vacuum 26. These interstitial spaces 36 can also or alternatively be at least partially filled with an insulating gas 76. The opacifier-coated microspheres 164 can also be loosely packed with a secondary insulating material 38 as exemplified in FIG. 5. The combination of the opacifier-coated microspheres 164 and the secondary insulating material 38 can form a substantially homogenous microsphere-based insulating material 180 that can be filled within an insulating cavity 12. The opacifier-coated microspheres 164 can also be tightly packed with the secondary insulating material 38 as exemplified in FIG. 6. The use of the opacifier-coated microspheres 164 can also be incorporated within the secondary insulating material 38 that is used in conjunction with the microsphere aggregates 34 discussed above. This secondary insulating material 38 can include the opacifier-coated microspheres 164 or can be added with another secondary insulating material 38 to be combined within the interstitial spaces 34 defined between the microsphere aggregates 34.

Referring now to FIGS. 9-11 and 17, a method 500 is disclosed for forming leached microspheres 40 for use in a low-density insulating material 10. As discussed above, leached microspheres 40 can be used within the microsphere aggregates 34. A benefit of using the leached microspheres 40 is in the existence of the through holes 50 that extend through the outer wall 44 of the leached microsphere 40 so that air 24 and/or insulating gas 76 can be moved into or out of the interior volume 46 of the leached microsphere 40. According to the method 500, glass particles 160 are heated to the predetermined temperature 166 to define molten glass particles 168 (step 502). As discussed above, this predetermined temperature 166 can be within the range of approximately 900° C. to approximately 1100° C. Through this heating process 190, the molten glass particles 168 each define an outer wall 44 and an interior volume 46 defined therein in the general shape of a hollow microsphere 52.

According to the method 500, the molten glass particles 168 are cooled during a cooling phase 162 to an intermediate temperature 170 to define a heated solid microsphere 172 (step 504). Typically, this intermediate temperature 170 can have an upper limit of approximately 400° C. At this temperature, the components of the heated solid microsphere 172 are typically substantially solidified. These heated solid microspheres 172 can then be reheated from the intermediate temperature 170 to a phase separating temperature 132 to define phase separated microspheres 138 (step 506).

As discussed above, the leached microspheres 40 are phase separated such that the boron 136 and/or other components of the microspheres 52 are heated and caused to migrate or otherwise move to the outer periphery 134 of the microsphere. Typically, this reheating process 194 to the phase separate the microspheres 52 and can last from approximately 30 minutes to approximately two hours.

According to various aspects of the device, the phase separating temperature 132 can be in the range of approximately 400 degrees Celsius to 900 degrees Celsius. This temperature causes the boron 136 included within the borosilicate glass to become molten while the other components of the microsphere 52 remain substantially solidified. In this manner, the boron 136 migrates to the surface of the microsphere 52. This configuration allows for migration of the boron 136 to the outer periphery 134 of each microspheres 52 so that the acid used in the acid bath 56 can access the boron 136, as will be described more fully below.

According to method 500, the phase separated microspheres 138 are then leached within an acid solution in an acid bath 56 (step 508). The acid bath 56 leeches boron 136 from the phase separated microspheres 138 to define the leached microspheres 40. As discussed above, the phase separated microspheres 138 are defined by boron 136 being moved or migrating to the outer periphery 134 of each microsphere 52. In this configuration, the acid within the acid bath 56 can conveniently access and interact with the boron 136 of the phase separated microsphere 138. The boron 136 can then be leached, etched, eroded, or otherwise removed from the outer wall 44 of the microsphere 52. Once the leaching process 130 is complete, the leached microspheres 40 typically include various cavities 48 and through holes 50 that are defined within and/or extend through the outer wall 44 of the microsphere 52.

Figure 10:
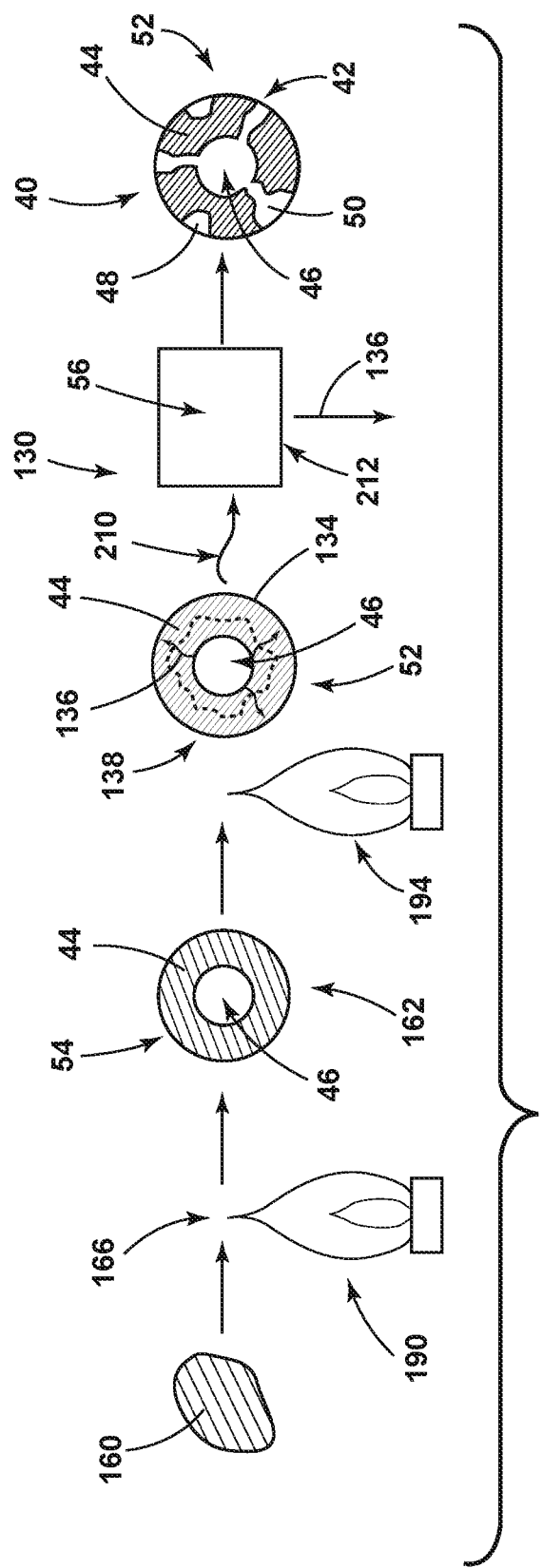
FIG. 10 is a schematic diagram illustrating a process for forming leached microspheres.
Figure 11:
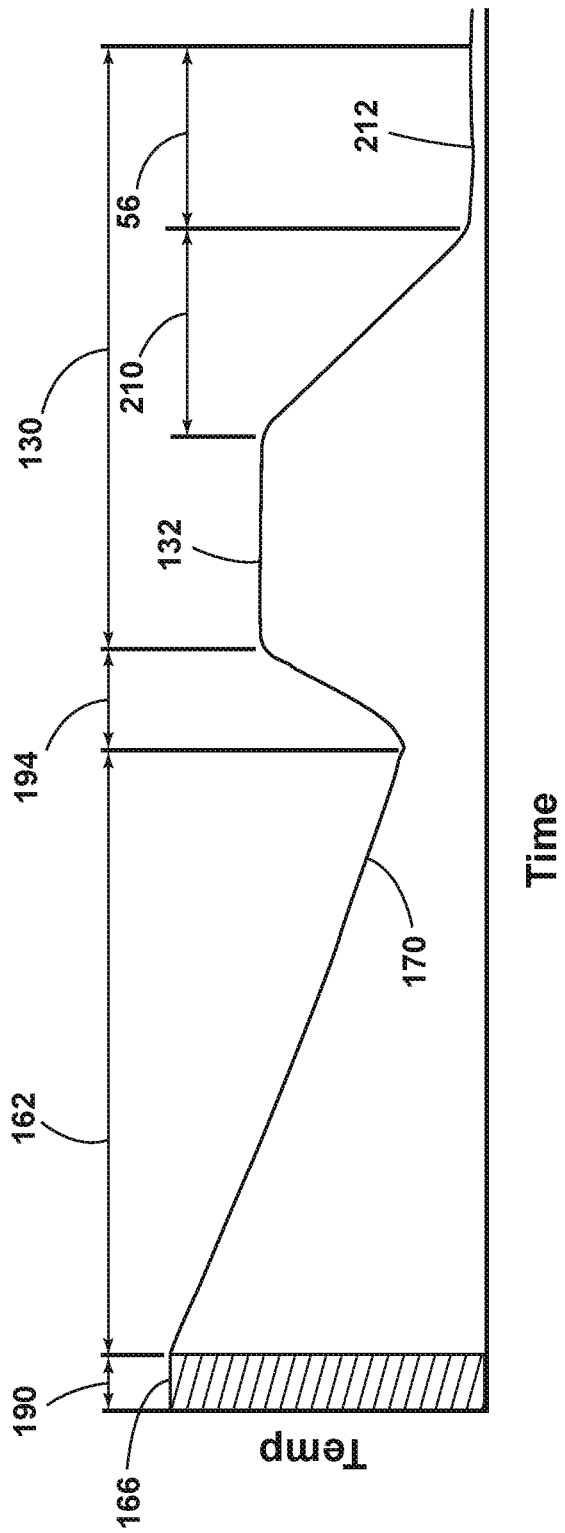
FIG. 11 is a schematic graph showing the use of heat in forming leached microspheres that incorporates a cooling phase of the microsphere formation process.
Figure 15:
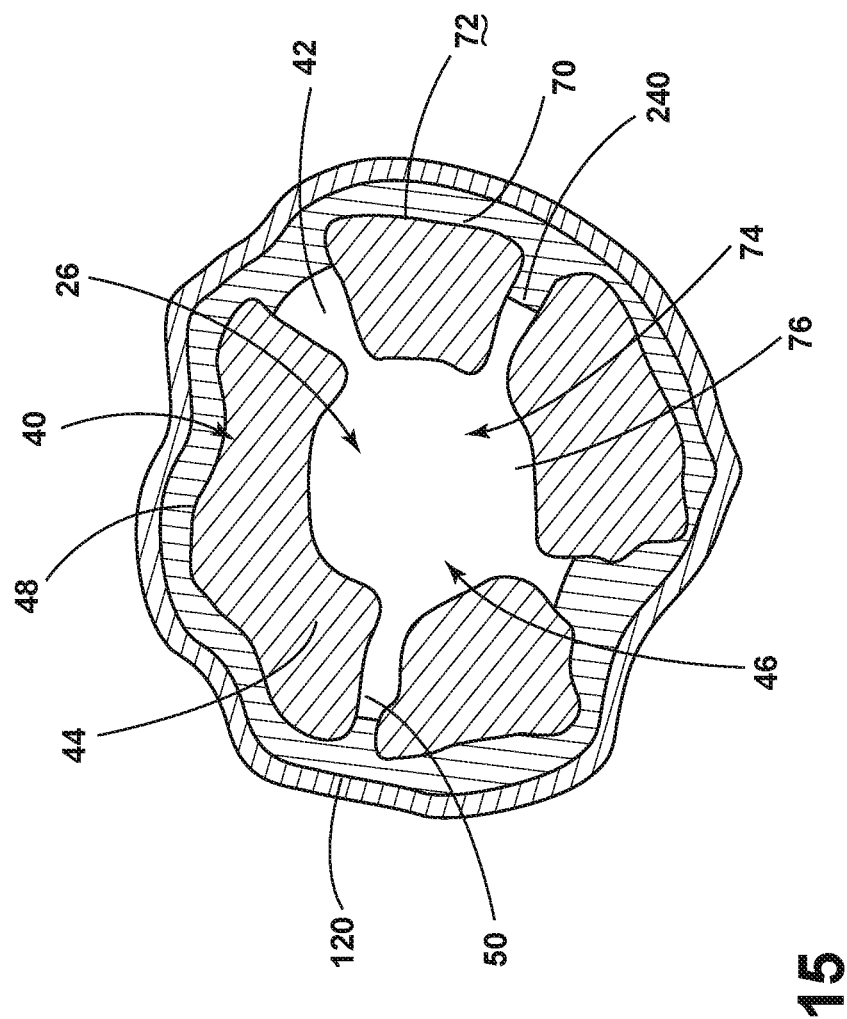
FIG. 15 is a schematic cross-sectional view of a leached microsphere that is coated with a binder and includes a controlled environment within the interior volume of the microsphere.
Figure 16:
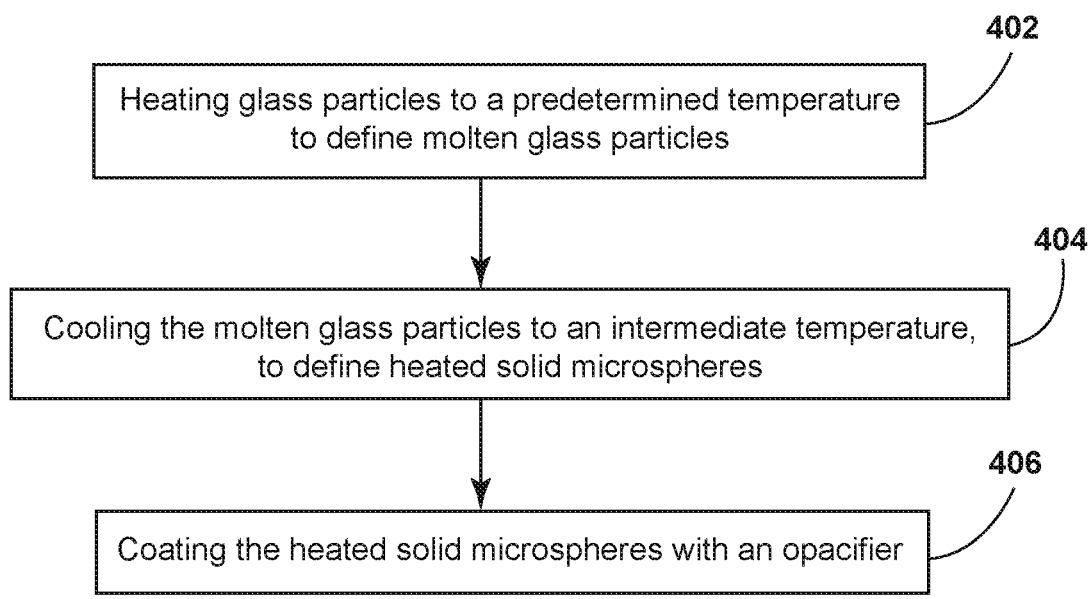
FIG. 16 is a schematic flow diagram illustrating a method for forming opacifier coated insulating microspheres for use in an appliance cabinet.
Figure 17:
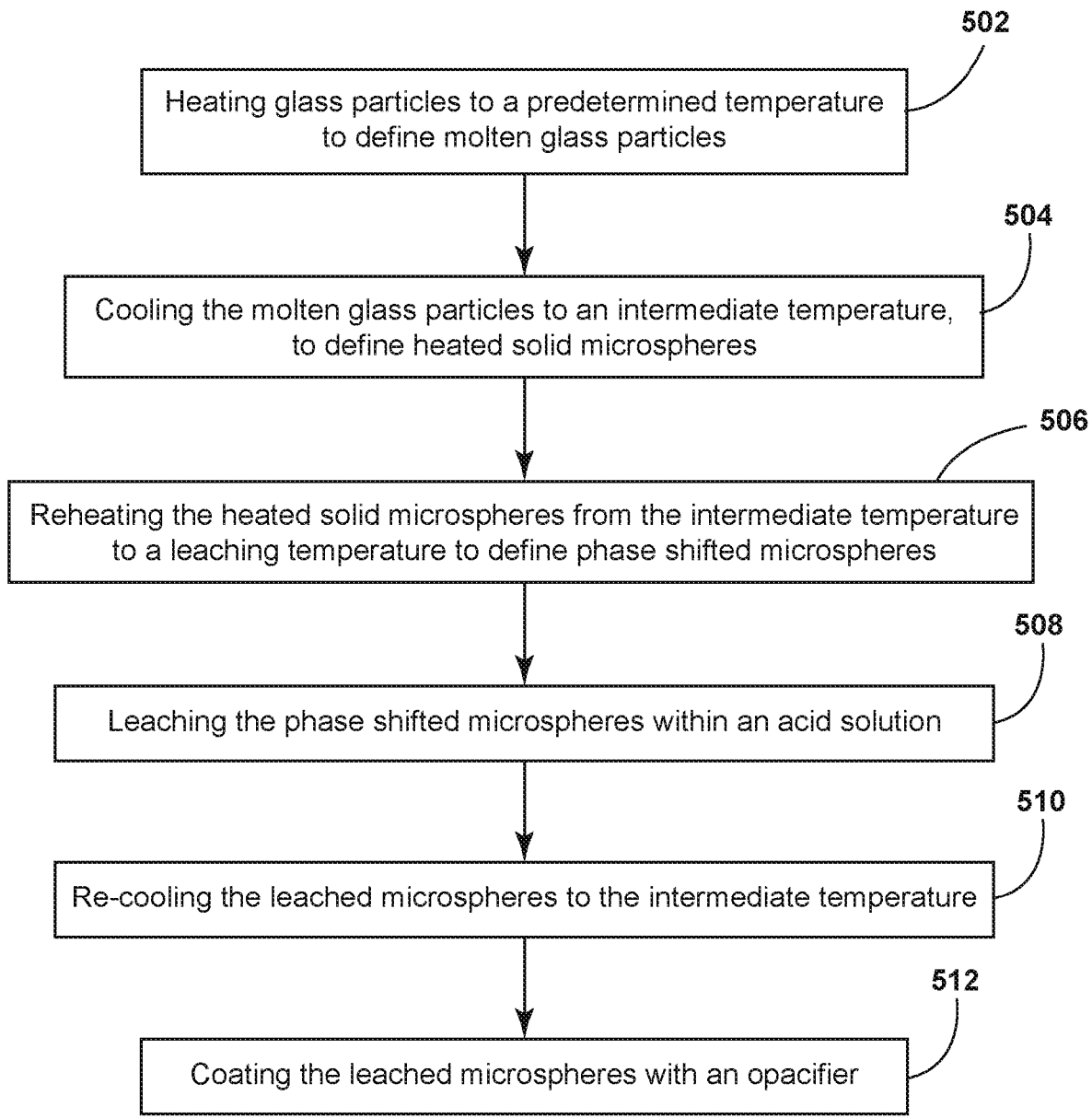
FIG. 17 is a linear flow diagram illustrating a method for forming a low density microsphere-based insulating material.
Figure 18:
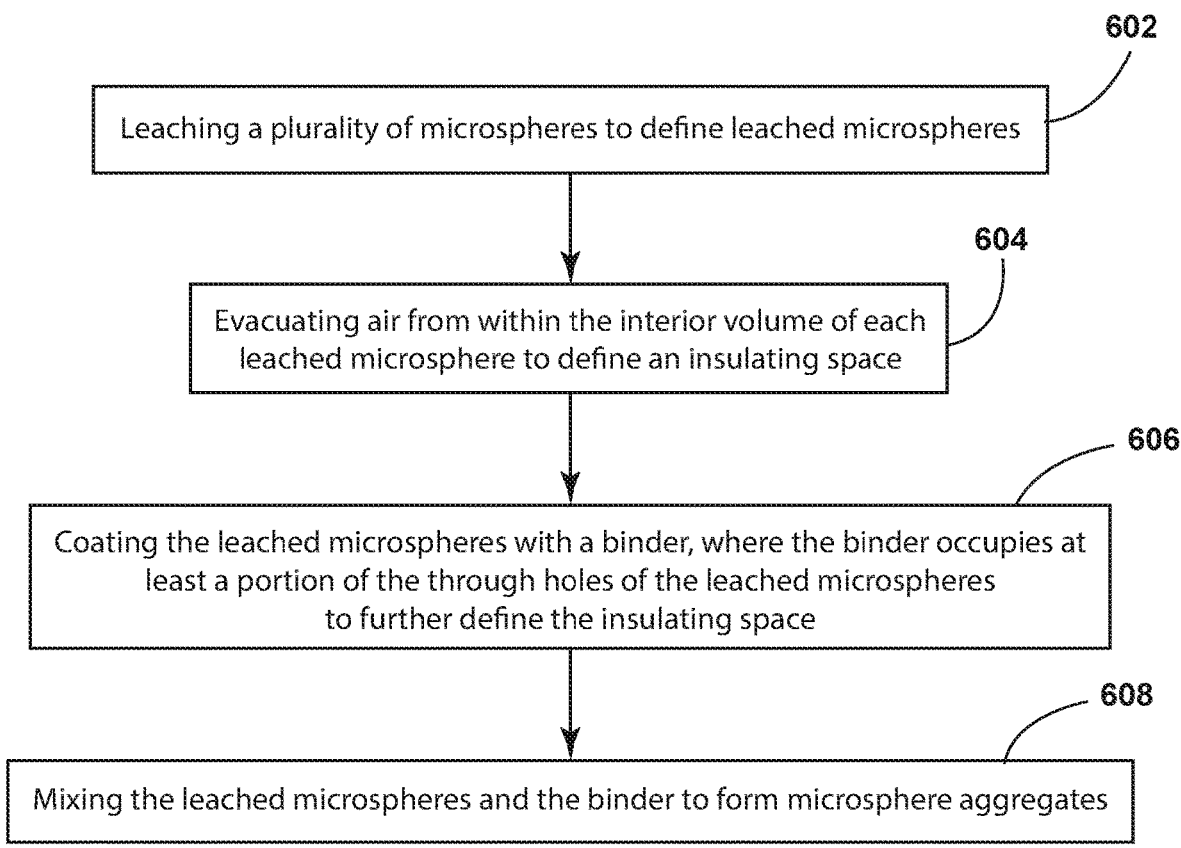
FIG. 18 is a linear flow diagram illustrating a method for forming a low density microsphere-based insulating material.
Figure 19:
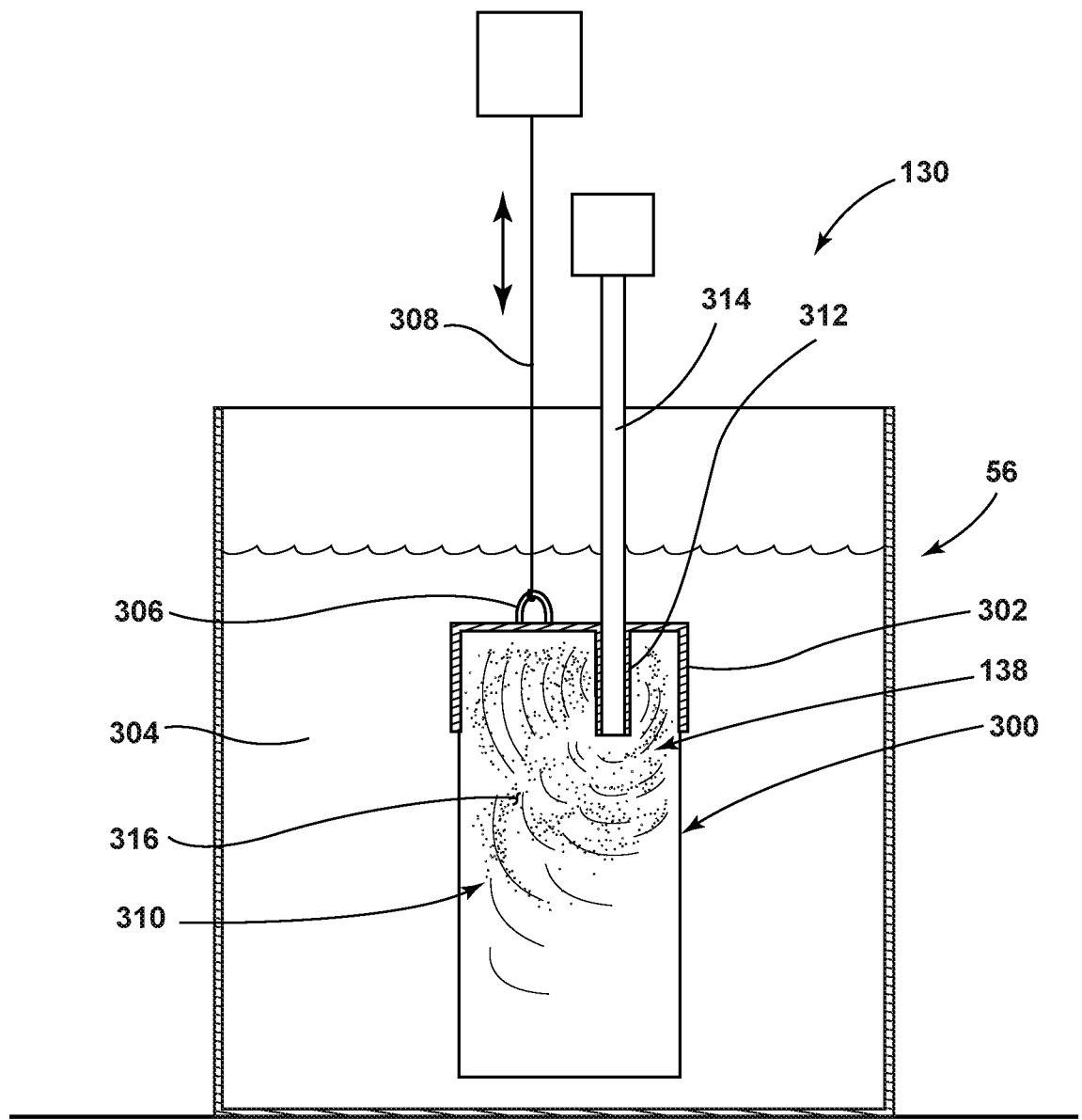
FIG. 19 is a schematic diagram illustrating performance of a leaching process using a mesh container within an acid bath.

Referring now to FIGS. 10, 15 and 19, the leaching process 130 can be performed within the acid bath 56 by placing the phase separated microspheres 138 within a mesh basket 300. This mesh basket 300 can be made of a fine mesh having aperture sizes that are smaller than a typical diameter of the phase separated microspheres 138. According to various aspects of the device, an exemplary mesh size can be formed into a 74 micron mesh container. This mesh container can include a structural cap 302 that encloses a portion of the mesh container. The structural cap 302 also has sufficient weight to cause the mesh container and the phase separated microspheres 138 contained therein to be fully submerged within the acid bath 56. Typically, the phase separated microspheres 138 are hollow and will be generally buoyant within the acid bath 56. If the phase separated microspheres 138 are allowed to float within the acid bath 56, at least a portion of the phase separated microspheres 138 will float above the acid solution 304 and may avoid direct contact with the acid solution 304 disposed within the acid bath 56. By using the mesh container having the structural cap 302, the phase separated microspheres 138 contained therein can be submerged within the acid bath 56 so that the acid solution 304 within the acid bath 56 can engage substantially all of the outer surface 72 of the phase separated microspheres 138.

Referring again to FIGS. 10, 15 and 19, included within the structural cap 302 for the mesh container is a connector 306, such as a hook, that can be used to attach a linkage 308 for raising and lowering the mesh container within the acid bath 56. Once the leaching process 130 is complete, the linkage 308 can be operated to lift the mesh container, via the connector 306 of the structural cap 302, out of the acid bath 56. The mesh container has a mesh size sufficient to allow the acid solution 304 within the acid bath 56 to pass through the mesh of the mesh container and fill the contained space 310 within the mesh container.

Referring again to FIGS. 10, 15 and 19, the structural cap 302 can also include a receiver 312 that links with a vibrating mechanism. According to various aspects of the device, this receiver 312 can engage a vibrating rod 314 that is connected with the structural cap 302. The vibrating rod 314, in various aspects of the device, can extend through the structural cap 302 and extend into the contained space 310 of the mesh container. During operation of the leaching process 130, the vibrating rod 314 can be coupled with the structural cap 302. Activation of the vibrating rod 314 causes a vibrating action, such as an ultrasonic vibration 316, that passes through the vibrating rod 314 and into the mesh container. This ultrasonic vibration 316 may also causes a vibration within the phase separated microspheres 138. Ultrasonic vibration 316 of the phase separated microspheres 138 causes the phase separated microspheres 138 to vibrate against one another and prevent clumping or adhesion of the various phase separated microspheres 138. By preventing clumping or adhesion of the various phase separated microspheres 138, the acid solution 304 within the acid bath 56 can more efficiently surround each of the phase separated microspheres 138. This can result in a more complete and homogenous leaching of the boron 136 from the phase separated microspheres 138. Additionally, the use of the mesh basket 300, the structural cap 301 and the ultrasonic vibration in conjunction with the acid bath 56 can produce leached microspheres 40 that have a greater number of holes 50. Using this device in the leaching process 130, the holes 50 also are smaller in size. Accordingly, the larger number of holes 50 provides better extraction of air and better infiltration of insulating gas 76 into the insulating space 74 of the leached microsphere 40. Also, the smaller sized holes 50 result in a better configuration of the remaining silica material of the leached microsphere 40. This configuration of the silica material provides a better structure and integrity for resisting the inward compressive forces 92.

According to various aspects of the device, the structural cap 302 can include a single receiver 312 that receives the linkage 308 and the vibrating bar within a single attachment of the structural cap 302. In such an embodiment, the linkage 308 can deliver the ultrasonic vibration 316 to the structural cap 302 to be disseminated throughout the structural cap 302 of the mesh container and into the various phase separated microspheres 138 contained therein. In using the vibrating rod 314 with the mesh container, the ultrasonic vibration 316 can be a continuous vibration that occurs throughout the leaching process 130. It is also contemplated that the ultrasonic vibration 316 can be an intermittent vibration or can be a vibration having a modified frequency throughout the leaching process 130.

Through the use of the mesh container and the structural cap 302 having the connector 306 and the receiver 312, the use of the ultrasonic vibration 316 can be implemented to generate leached microspheres 40 having substantially homogeneity regarding the number of leached openings 42 defined within each leached microsphere 40 as well as the size of each of the leached openings 42 within the leached microspheres 40. The use of the ultrasonic vibration 316 also provides for a more efficient leaching process 130 such that the acid solution 304 within the acid bath 56 can better engage the outer surface 72 of the phase separated microspheres 138. Because the acid solution 304 has better access to each phase separated microsphere 138, the leaching process 130 can be conducted in a faster and more efficient manner. The use of the mesh container having the structural cap 302 also allows for a user of such a device to be adequately shielded and/or separated from contact with the acid bath 56.

According to various aspects of the device, the mesh container can be made of various materials that can include, but are not limited to, plastic, metal, ceramic, composite, combinations thereof, and other similar materials that are resistant to the acid solution 304 contained within the acid bath 56. The material used for the mesh container is also able to be formed into a wire mesh having a mesh size that is smaller than the diameter of the phase separated microspheres 138 and also smaller than the leached microspheres 40 that are formed as a result of the leaching process 130. Typically, the mesh of the mesh basket 300 is a mesh size large enough to allow the leached boron 136 to pass out of the mesh basket 300. As discussed above, the structural cap 302 of the mesh container is made of a material having a weight sufficient to fully submerge the mesh basket 300 and each of the phase separated microspheres 138 contained within the mesh container.

According to various aspects of the device, the structural cap 302 can be made of a lighter material and the linkage 308 that attaches to the structural cap 302 can push the mesh container and structural cap 302 downward to be fully submerged within the acid bath 56. Typically, the structural cap 302 will have a sufficient weight to cause the submersion of the mesh container and the phase separated microspheres 138 within the acid bath 156.

As discussed above, the use of the ultrasonic vibration 316 transmitted through the vibrating rod 314 and into the structural cap 302 allows the powder contents that make up the phase separated microspheres 138 to remain broken apart such that no formation of agglomerates or aggregates occurs. By preventing the formation of agglomerates and aggregates, the acid solution 304 is able to be intermingled within and around each of the phase separated microspheres 138 so that the outer surfaces of each of the phase separated microspheres 138 can be engaged by the acid solution 304 of the acid bath 56 to quickly and efficiently complete the leaching process 130.

As part of the leaching process 130, the phase separated microspheres 138 are cooled during a secondary cooling phase 210 to a leaching temperature 212 before they are included within the acid bath 56. This leaching temperature 212 is typically within a range of from approximately 80 degrees Celsius to 100 degrees Celsius. This temperature maximizes the leaching process 130 so that the leached microspheres 40 have a sufficient amount of boron 136 removed from the outer wall 44 of the microsphere 52 to form the through holes 50 that provide access to the interior volume 46 of each microsphere 52. Additionally, boron 136 is generally a heavy material in relation to the other components of the hollow microspheres 52. With the boron 136 removed, the microspheres 52 are diminished in weight so that the overall weight of the microspheres 52 and the ultimate insulating material is much lighter than insulating materials that include un-leached microspheres 52.

According to method 500, the leached microspheres 40 are re-cooled to the leaching temperature 212 (step 510). In various aspects of the device, during this secondary cooling phase 210, the leached microspheres 40 can be coated with an opacifier 120. The step of coating the leached microspheres 40 with an opacifier 120 may also be omitted where the leached microspheres 40 will be added to a mixer 250 and blended with a binder 70. In such an embodiment, the step of coating with an opacifier 120 can occur after the microsphere aggregates 34 are formed. Through the method 500, the leached microspheres 40 can be formed within a relatively short period of time without fully cooling the formed leached microspheres 40. During the process of forming the leached microspheres 40, the glass particles 160 are heated to form the molten glass particles 168 and are cooled. Before the heated solid microspheres 170 are fully cooled, they are reheated to the phase separating temperature 132. The leaching process 130 can last from approximately one hour to approximately three hours, depending upon various factors that can include, but are not limited to, the size of the microspheres 52, the boron 136 content of the glass particles 160, the amount of glass particles 160 to be leached, and other similar factors. In various aspects of the device, the leached microspheres 40 can be packed with an opacifier 120 and/or a secondary insulating material 38 in the absence of a binder 70. In such an aspect, the leached microspheres 40 can allow for better packing due to the presence of the leached openings 42. Additionally, the opacifier 120 and the secondary insulating material 38 can be packed around the leached microspheres 40 and can also be packed within the leached openings 42. This can result in a more dense insulating material that is efficiently packed and includes an improved resistance to radiative thermal conductivity.

According to the various aspects of the method 500, a coating step 512 can include coating the leached microspheres 40 and/or the microsphere aggregates 34 with an opacifier 120. In such an embodiment, the various steps and processes of the method 500 can occur within a single assembly. A single assembly can be in the form of an assembly line or various sequential mechanisms that can be combined to perform sequential steps that form the microspheres 52, cool the microspheres 52, leech the microspheres 52, and then potentially coat the microspheres 52. This assembly can be used to form leached microspheres 40 that can be moved to a separate location for delivery, packaging, or installation within an insulating structure.

Referring now to FIGS. 12-15 and 18, having described various aspects of the low-density microsphere aggregates 34 and their inclusion within various insulating cabinets 16, a method 600 is disclosed for forming a low-density microsphere aggregate 34. According to the method 600, a plurality of microspheres 52 are leached to define leached microspheres 40 (step 602). As discussed above, the various leached microspheres 40 include an outer wall 44 that defines an interior volume 46 therein. Each leached microsphere 40 typically includes leached openings 42 in the form of cavities 48 and/or through holes 50 within the outer wall 44 of the leached microsphere 40. As discussed above, the formation of the through holes 50 within the leached microspheres 40 allows for air 24 and various insulating gases 76 to be delivered into or removed from the interior volume 46 of each leached microsphere 40.

According to the method 600, step 604 includes evacuating air 24 from within the interior volume 46 of each leached microsphere 40 having a through hole 50 within the outer wall 44. By removing air 24 from the interior volume 46, an insulating space 74 is defined within each leached microsphere 40 that includes one or more through holes 50. As part of this step 604, the evacuation of air 24 can be contemporaneously coincided with adding an insulating gas 76 to the interior volume 46 of the leached microsphere 40.

According to the method 600, the leached microspheres 40 are coated with a binder 70. The binder 70 during this step 606 engages the leached microsphere 40 and at least partially occupies at least a portion of the through holes 50 of the leached microspheres 40. In this manner, the binder 70 at least partially defines the insulating space 74 of the leached microsphere 40 having one or more through holes 50. Stated another way, the binder 70 forms a plug 240 (shown in FIG. 15) that at least partially occupies the through hole 50, and prevents gas from entering into or escaping from the insulating space 74 of the leached microsphere 40. To better coat the leached microspheres 40 with the binder 70, the leached microspheres 40 and the binder 70 are mixed within a mixer 250 (step 608). The binder 70 is added to the leached microspheres 40 contemporaneously with operation of the mixer 250. Mixing of the leached microspheres 40 and the binder 70 results in a plurality of microsphere aggregates 34. At least a portion of the leached microspheres 40 within the microsphere aggregates 34 includes the insulating space 74.

According to the various embodiments, the size of the microsphere aggregates 34 can be dictated by the amount of binder 70 added and the mixing operation 252 performed by the mixer 250. The mixing operation 252 can be defined by mixing speed, duration of the mixing operation 252, configuration of the blade used within the mixer 250, sequences of faster and slower mixing periods, periods of rest, combinations thereof and other similar mixing operations 252. Typically, the microsphere aggregates 34 will be formed to have a size of from approximately 4 millimeters to approximately 0.1 millimeters. The microsphere aggregates 34 can also include varying shapes such as coral structures, strands, granules, irregular shapes, and other similar shapes. It should be understood that other sizes of microsphere aggregates 34 are possible depending upon the amount of binder 70 added and the type of mixing operation 252 performed as the binder 70 is added.

Referring again to FIGS. 12, 14 and 15, the insulating space 74 of the leached microsphere 40 can be formed to define an at least partial vacuum 26 by performing the mixing operation 252 and adding the binder 70 within a vacuum chamber 260 that defines an at least partial vacuum 26. The microspheres 52 can be added to the mixer 250, and the air 24 can be expressed from the interior space 262 of the vacuum chamber 260. By removing air 24 from the vacuum chamber 260, air 24 is also removed through the interior volume 46 of the leached microspheres 40 via the through holes 50 of the outer wall 44. Various sensors 264 can be added to an outlet 266 of the vacuum chamber 260 to assess how much air 24 or other gas remains within the vacuum chamber 260. Once a desired degree of vacuum or pressurization is achieved, the operation for adding the binder 70 and the contemporaneous mixing operation 252 can be performed. Once this mixing operation 252 is complete and the appropriate amount of binder 70 is added, the microsphere aggregates 34 are substantially formed and the insulating space 74 within each of the leached microspheres 40 is also formed. Because the binder 70 forms the plug 240 that surrounds and occupies at least a portion of the through holes 50, air 24 is substantially prevented from infiltrating into this insulating space 74. The level of vacuum desired within the insulating space 74 can be within a range of from approximately less than one millibar to approximately fifty millibars. Additionally, this level of vacuum within the insulating space 74 of the leached microspheres 40 can be maintained for an extended period of time.

Figure 13:
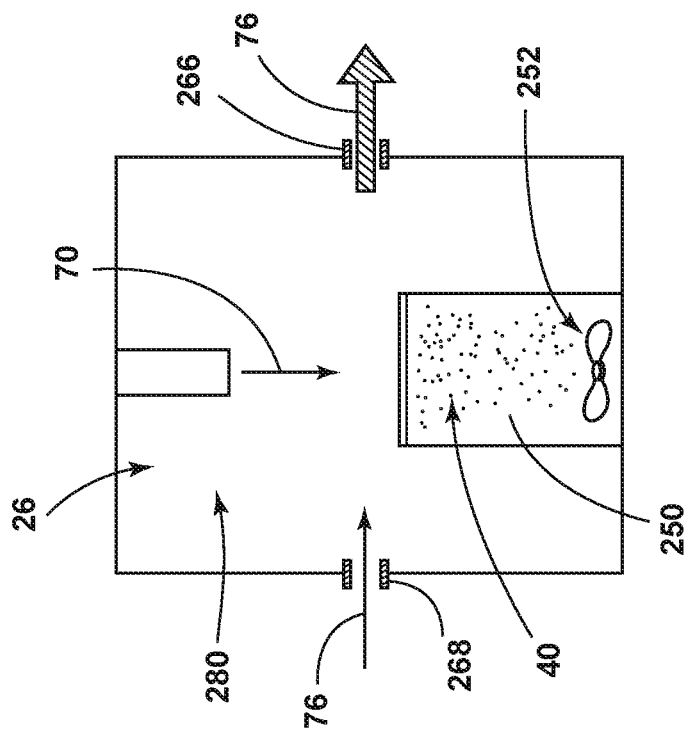
FIG. 13 is a schematic diagram illustrating an assembly for forming microspheres that include an inert gas contained within the interior volume of the microsphere.
Figure 12:
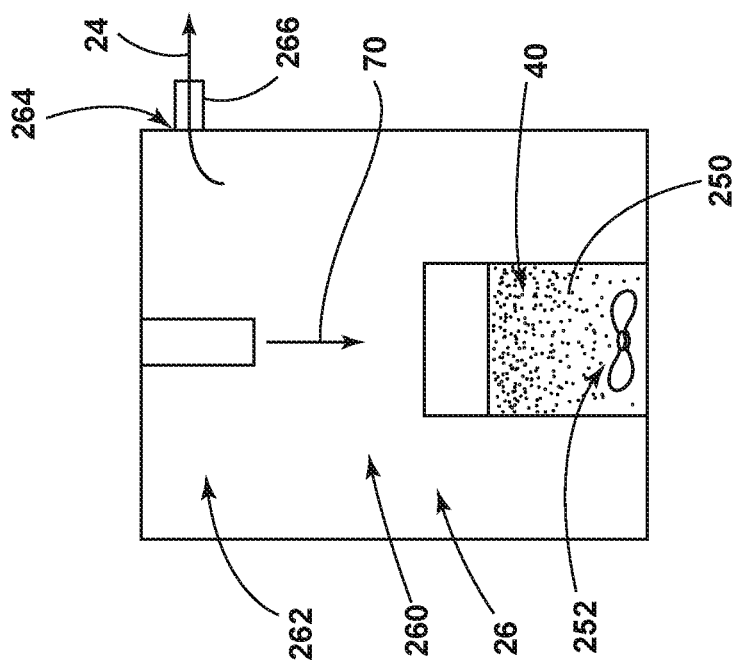
FIG. 12 is a schematic diagram illustrating an assembly used for forming microspheres that include an at least partial vacuum within an interior volume of the microspheres.
Figure 14:
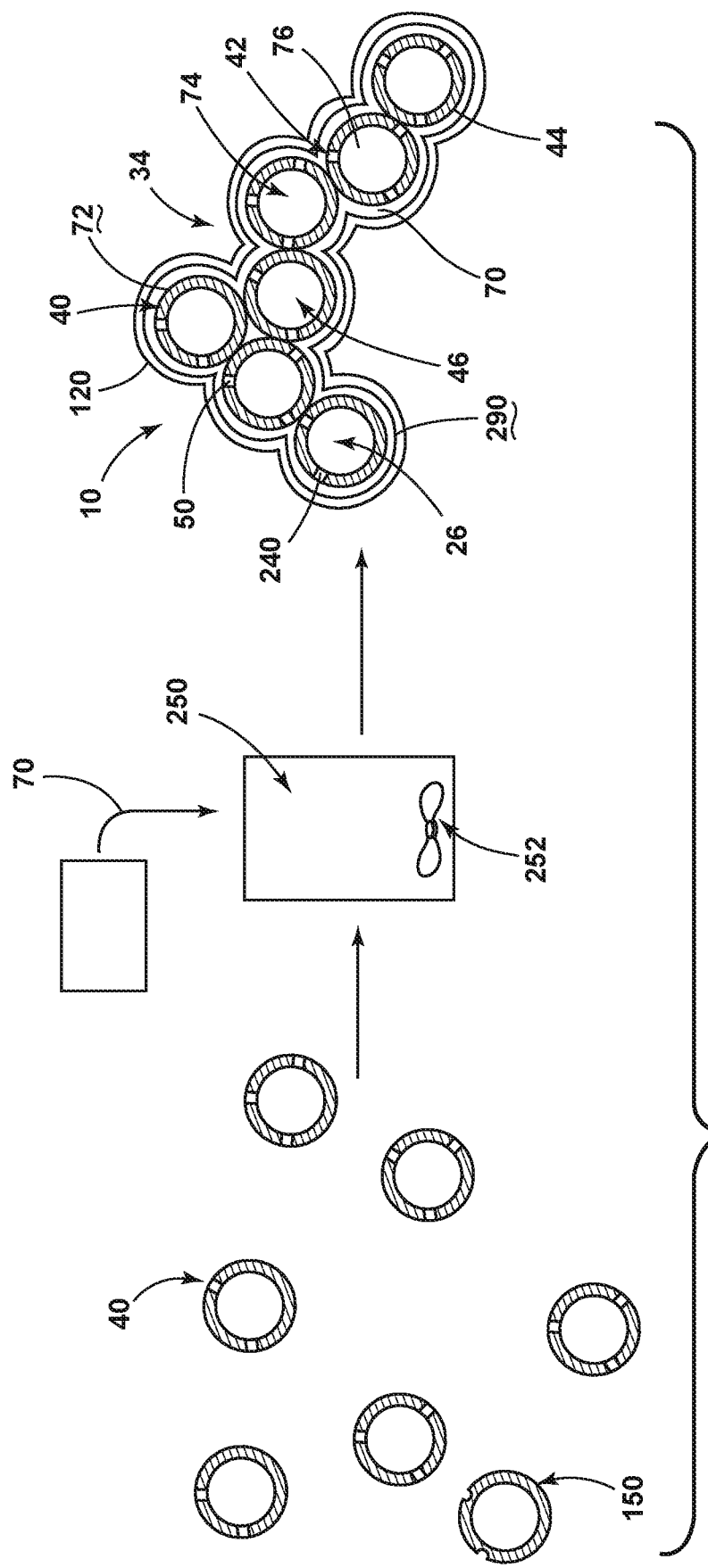
FIG. 14 is a schematic diagram illustrating a method for forming the microsphere aggregates using leached microspheres.

Referring now to FIGS. 13-15, the insulating space 74 can also be defined by an insulating gas 76 that is maintained within the interior volume 46 of this microsphere 52. In such an embodiment, the leached microspheres 40 can be disposed within a conditioned chamber 280 where an insulating gas 76 is injected into the conditioned chamber 280 via an inlet 268 and also removed from the conditioned chamber 280 via an outlet 266. By filling the conditioned chamber 280 with the insulating gas 76, the various interior volumes 46 defined within the leached microspheres 40 can also be occupied by the insulating gas 76. In various aspects of the device, the insulating gas 76 can be disposed within the conditioned chamber 280 and the insulating gas 76 can also define an at least partial vacuum 26 such that the gas that is within the insulating chamber is in the form of the insulating gas 76. In such an embodiment, more of the insulating gas 76 is removed via the outlet 266 than is injected into the conditioned chamber 280 via the inlet 268. Accordingly, the insulating gas 76 can be defined within each of the insulating spaces 74 of the leached microspheres 40 and kept at a pressure similar to that of the at least partial vacuum 26 discussed above (i.e., approximately less than one millibar to approximately fifty millibars). During the mixing operation 252, the insulating gas 76 is maintained therein and the binder 70 is added to the microspheres 52 and is subsequently or contemporaneously mixed so that the binder 70 surrounds the leached microspheres 40 and forms the plug 240 that substantially occupies portions of the through holes 50 extending therethrough. In this manner, the binder 70 prevents air 24 from entering into the insulating space 74 and also prevents the insulating gas 76 from leaving the insulating space 74.

According to various aspects of the device, after the microsphere aggregates 34 are formed, an opacifier 120 can be added to an outside surface 290 of the microsphere aggregates 34.

According to various aspects of the device, the microsphere aggregates 34 can be incorporated within the various insulating structures. These insulating structures can include, but are not limited to, vacuum insulated panels, vacuum insulated cabinets, structural cabinets for appliances 14 and other similar insulated structures. The microsphere aggregates 34 can also be used within various appliances 14. These appliances 14 can include, but are not limited to, refrigerators, freezers, coolers, laundry appliances, dishwashers, hot water heaters, kitchen-type utensils, and other similar appliances 14 and fixtures.

In the various mixing operations 252 defined herein, the mixing operation 252 can be performed by an impeller for a mixer 250, a rotating drum, various rollers, agitating or vibrating mechanisms, particulate matter suspended within air 24 or an insulating gas 76 and delivered through a material to be coated or mixed, and other similar mixing, delivering, or agitating processes.

Figure 7:
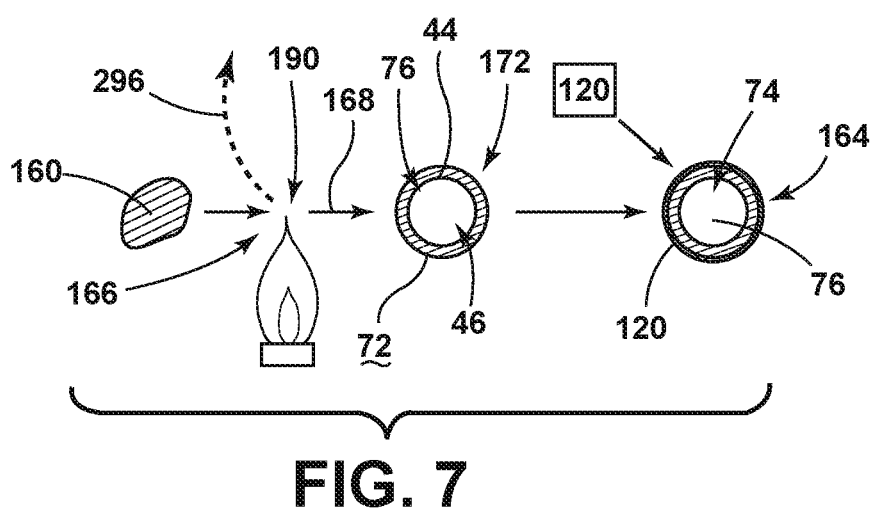
FIG. 7 is a schematic flow diagram illustrating an aspect of a method for forming an opacifier-coated microsphere.
Figure 8:
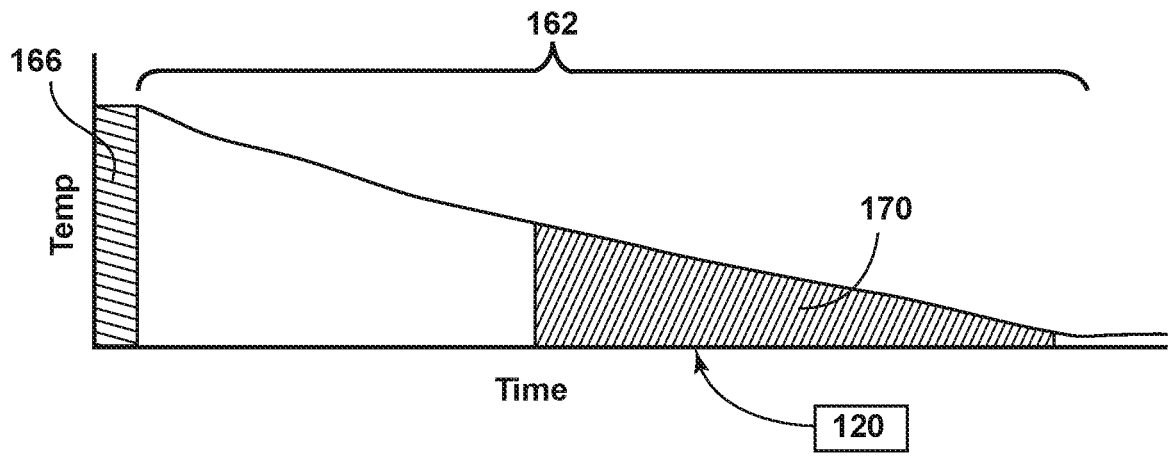
FIG. 8 is a schematic graph showing a process for forming the opacifier-coated microspheres during a cooling phase of the microsphere formation process.
Figure 9:
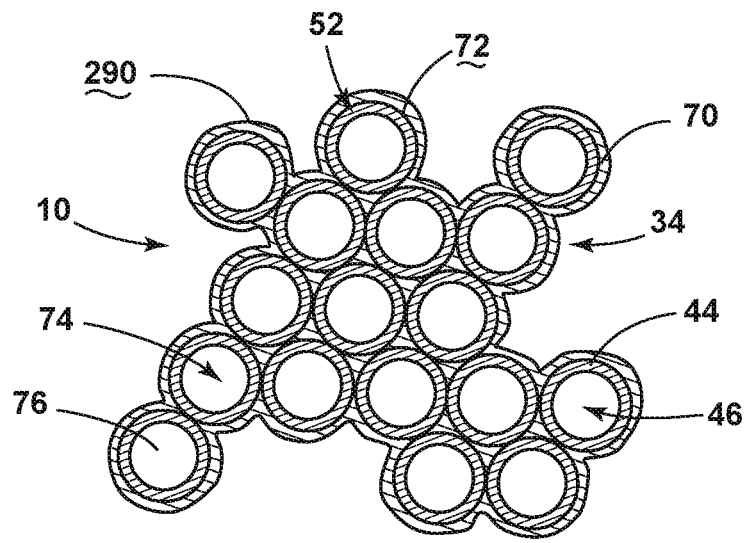
FIG. 9 is a schematic cross-sectional view of a microsphere aggregate that includes a plurality of microspheres held together by a binder.

According to various aspects of the device, as exemplified in FIGS. 7 and 10, the insulating gas 76 defined within the interior volume 46 of the microspheres 52 or the insulating space 74 of the leached microspheres 40 can be in the form of carbon dioxide. In such an embodiment, the carbon dioxide can be formed therein as a byproduct of the formation of the microspheres 52. When the glass particles 160 are first heated to form the molten glass particles 168, combustion over or within a flame of the glass particles 160 can lead to formation of a carbon dioxide byproduct 296. This carbon dioxide byproduct 296 can be entrapped within the interior volume 46 of the microsphere 52. The various heating agents and additives can be added to the environment within which the glass particles 160 are heated to form the molten glass particles 168. These additives and other elements can be used to increase the amount of carbon dioxide byproduct 296 generated as a result of the formation of the microspheres 52. This carbon dioxide byproduct 296 can be entrapped within the interior volume 46 of the microsphere 52. In such an embodiment, where carbon dioxide byproduct 296 is disposed within a substantial part of the interior volume 46 of the microsphere 52, the leaching process 130 may not be necessary for disposing the insulating gas 76 within the interior volume 46 or the insulating space 74 of the microsphere 52. Various mechanisms and sensory equipment can be used to determine the contents of an interior volume 46 of the various microspheres 52.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical, chemically or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width 98 of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerating appliance comprising:
   an inner liner and an outer wrapper that define an insulating cavity therebetween, wherein an at least partial vacuum is defined within the insulating cavity;
   a plurality of microsphere aggregates disposed within the insulating cavity, wherein interstitial spaces are defined between the microsphere aggregates, wherein each microsphere aggregate includes a size of from approximately 0.1 millimeters to approximately 4 millimeters, each microsphere aggregate comprising:
      at least one leached microsphere having a leached opening that extends through an outer wall and to an interior volume of each leached microsphere of the at least one leached microsphere;
      a binder that engages an outer surface of the outer wall, wherein the binder is disposed within a portion of the leached opening and at least partially defines the interior volume; wherein
      the interior volume of each leached microsphere defines an insulating space that is at least partially defined by the binder;
      the binder and the outer wall define a substantially air-tight seal around the insulating space.

2. The refrigerating appliance of claim 1, further comprising:
   an insulating gas that is disposed within the insulating cavity and substantially occupies the interstitial spaces.

3. The refrigerating appliance of claim 1, wherein the at least partial vacuum defined within the insulating cavity exerts an inward compressive force against exterior surfaces of the outer wrapper and the inner liner, and wherein at least the plurality of microsphere aggregates engage inner surfaces of the outer wrapper and the inner liner, wherein the plurality of microsphere aggregates defines an interior structure that substantially opposes the inward compressive force.

4. The refrigerating appliance of claim 3, wherein the interior structure defined by the plurality of microsphere aggregates substantially resists deflection of the outer wrapper and the inner liner toward one another.

5. The refrigerating appliance of claim 3, wherein each microsphere aggregate of the plurality of microsphere aggregates is in direct engagement with at least one adjacent microsphere aggregate of the plurality of microsphere aggregates.

6. The refrigerating appliance of claim 1, further comprising:
an opacifier that coats the outer surface of the plurality of microsphere aggregates.

7. The refrigerating appliance of claim 1, wherein an opacifier is incorporated within the binder of the plurality of microsphere aggregates.

8. The refrigerating appliance of claim 1, wherein at least a portion of the plurality of microsphere aggregates includes at least one partially-leached microsphere, wherein each at least one partially-leached microsphere includes at least one cavity that extends partially into the outer wall.

9. The refrigerating appliance of claim 1, further comprising:
an insulating powder disposed within the insulating cavity, wherein the insulating powder is disposed within the interstitial spaces defined between the microsphere aggregates.

10. The refrigerating appliance of claim 9, wherein an insulating gas is disposed within the insulating cavity and substantially occupies secondary interstitial spaces defined between the insulating powder and the plurality of microsphere aggregates.

11. The refrigerating appliance of claim 1, further comprising:
an insulating gas that is disposed within the insulating space of at least a portion of the at least one leached microsphere.

12. The refrigerating appliance of claim 11, wherein the insulating gas includes at least one of carbon dioxide, argon, xenon, krypton, and neon.

13. The refrigerating appliance of claim 1, wherein the insulating space includes an at least partial vacuum.

14. The refrigerating appliance of claim 1, wherein the at least one leached microsphere is derived from a boron-based glass.

15. The refrigerating appliance of claim 14, wherein the boron-based glass includes at least one of borosilicate glass, aluminosilicate glass, and boroaluminosilicate glass.

16. The refrigerating appliance of claim 1, wherein the binder includes at least one of polyethylene glycol, resin, natural wax, and synthetic wax.

17. The refrigerating appliance of claim 6, wherein the opacifier includes at least one of carbon black, silicon carbide, zinc oxide, rice husk ash, and titanium oxide.

18. The refrigerating appliance of claim 1, further comprising:
a secondary insulating material disposed within the insulating cavity, wherein the secondary insulating material is disposed within the interstitial spaces defined between the plurality of microsphere aggregates.

19. The refrigerating appliance of claim 18, wherein the secondary insulating material includes at least one of an opacifier, a silica-based material, an insulating powder, microspheres, hollow microspheres, glass fiber, and an insulating gas.

20. The refrigerating appliance of claim 1, wherein the insulating spaces of the plurality of microsphere aggregates are maintained at a pressure similar to a pressure of the at least partial vacuum of the insulating cavity.

* * * * *